(12) United States Patent
Chen et al.

(10) Patent No.: US 11,604,670 B2
(45) Date of Patent: Mar. 14, 2023

(54) VIRTUAL MACHINE LIVE MIGRATION METHOD, APPARATUS, AND SYSTEM

(71) Applicant: HUAWEI TECHNOLOGIES CO., LTD., Guangdong (CN)

(72) Inventors: Rui Chen, Shenzhen (CN); Qian Cao, Nanjing (CN); Yuping Zhao, Nanjing (CN); Xinyu Hu, Nanjing (CN); Hongbo Zhao, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 398 days.

(21) Appl. No.: 16/807,334

(22) Filed: Mar. 3, 2020

(65) Prior Publication Data
US 2020/0201667 A1 Jun. 25, 2020

Related U.S. Application Data

(63) Continuation of application No. PCT/CN2018/093917, filed on Jun. 30, 2018.

(30) Foreign Application Priority Data

Sep. 4, 2017 (CN) .......................... 201710785939.7

(51) Int. Cl.
G06F 9/455 (2018.01)
(52) U.S. Cl.
CPC .. G06F 9/45558 (2013.01); *G06F 2009/4557* (2013.01)
(58) Field of Classification Search
None
See application file for complete search history.

(56) References Cited

U.S. PATENT DOCUMENTS

| 8,775,781 B2 | 7/2014 | Warkentin et al. |
| 2007/0180436 A1 | 8/2007 | Travostino et al. |

(Continued)

FOREIGN PATENT DOCUMENTS

| CN | 101859263 A | 10/2010 |
| CN | 102118458 A | 7/2011 |

(Continued)

OTHER PUBLICATIONS

Tian Feng,"Title: Training on Network and System Management Tools", Press: Metallurgical Industry Press, Published: Jan. 2007, total 9 pages. With an English Abstract.

(Continued)

*Primary Examiner* — Wynuel S Aquino
(74) *Attorney, Agent, or Firm* — Womble Bond Dickinson (US) LLP

(57) ABSTRACT

A virtual machine live migration method, apparatus, and system relating to the field of communications technologies are disclosed. The method includes: in a process of live migration of a target virtual machine, obtaining pre-recorded storage location information corresponding to target service configuration information, where the target service configuration information is used by a target virtual acceleration component corresponding to the target virtual machine to perform service processing; reading the target service configuration information in a storage location corresponding to the storage location information; and sending the target service configuration information to a destination server, so that the destination server stores the target service configuration information. In the present disclosure, a service processing failure can be avoided.

16 Claims, 6 Drawing Sheets

(56) References Cited

U.S. PATENT DOCUMENTS

| | | | |
|---|---|---|---|
| 2008/0222633 A1 | 9/2008 | Kami | |
| 2011/0084973 A1 | 4/2011 | Masood | |
| 2011/0238820 A1 | 9/2011 | Matsuoka | |
| 2013/0086582 A1* | 4/2013 | Cardona | H04L 69/00 718/1 |
| 2013/0305242 A1 | 11/2013 | Wang et al. | |
| 2016/0139944 A1* | 5/2016 | Rouwet | G06F 9/45558 718/1 |
| 2016/0239319 A1 | 8/2016 | Zhang et al. | |
| 2018/0232254 A1* | 8/2018 | Mohan | G06F 3/0683 |
| 2018/0321985 A1* | 11/2018 | Kakaiya | G06F 9/5077 |

FOREIGN PATENT DOCUMENTS

| | | |
|---|---|---|
| CN | 102681913 A | 9/2012 |
| CN | 103049308 A | 4/2013 |
| CN | 103201721 A | 7/2013 |
| CN | 103346900 A | 10/2013 |
| CN | 103475560 A | 12/2013 |
| CN | 103647849 A | 3/2014 |
| CN | 103812823 A | 5/2014 |
| CN | 103890728 A | 6/2014 |
| CN | 103942087 A | 7/2014 |
| CN | 104142853 A | 11/2014 |
| CN | 104199716 A | 12/2014 |
| CN | 104468397 A | 3/2015 |
| CN | 104750554 A | 7/2015 |
| CN | 104965757 A | 10/2015 |
| CN | 106961487 A | 7/2017 |
| EP | 2581828 A1 | 4/2013 |
| EP | 2731010 A1 | 5/2014 |
| WO | 2014116678 A1 | 7/2014 |

OTHER PUBLICATIONS

ETSI GS NFV-IFA 002 V2.1.1: Network Functions Virtualisation (NFV); Acceleration Technologies; VNF Interfaces Specification Mar. 2016 total 30 pages.

* cited by examiner

VIRTUAL MACHINE LIVE MIGRATION METHOD, APPARATUS, AND SYSTEM

CROSS-REFERENCE TO RELATED APPLICATIONS

This application is a continuation of International Application No. PCT/CN2018/093917, filed on Jun. 30, 2018, which claims priority to Chinese Patent Application No. 201710785939.7, filed on Sep. 4, 2017. The disclosures of the aforementioned applications are hereby incorporated by reference in their entireties.

TECHNICAL FIELD

The present disclosure relates to the field of communications technologies, and in particular, to a virtual machine live migration method, apparatus, and system.

BACKGROUND

A skilled person usually installs a plurality of virtual machines on a network-side server, so that the server can process more service packets. Each virtual machine may implement a specified function (for example, can implement encryption and decryption on a service packet). An application program that is used to implement a specified function may be installed in the virtual machine, in other words, the virtual machine may implement the function by using the installed application program.

When many virtual machines are installed on the server, performance of the function implemented by the virtual machine is degraded. In this case, a virtual machine on a server (which may be referred to as a source server) including more virtual machines is usually migrated to a server (which may be referred to as a destination server) including fewer virtual machines, to implement live migration processing on the virtual machine. Specifically, when receiving a start instruction of performing live migration on a target virtual machine, the source server may obtain virtual machine memory data corresponding to the target virtual machine stored in the source server, and then send the virtual machine memory data to the destination server.

Currently, to improve the performance of the function implemented by the virtual machine, an acceleration component is usually disposed on the server, so that the acceleration component implements the function, in other words, executes the function through hardware acceleration. To share the acceleration component among the plurality of virtual machines on the server, a plurality of virtual acceleration components may be created by using an SR-IOV (single-root I/O virtualization, single-root input/output virtualization) technology. A quantity of virtual acceleration components is the same as a quantity of virtual machines on the server, and one virtual machine corresponds to one virtual acceleration component. In this case, each virtual machine may implement a corresponding function by using a corresponding virtual acceleration component. The virtual acceleration component usually executes a specified function based on service configuration information prestored in the virtual acceleration component. For example, if the acceleration component is a network acceleration component (for example, a network interface card), the corresponding function may be a function of forwarding a service packet. In this case, the service configuration information may be a route forwarding table. When implementing service packet processing, the virtual acceleration component may implement, based on the prestored route forwarding table, the function of forwarding a service packet. If a specified function is executed by using the virtual acceleration component, after virtual machine live migration ends, the destination server may enable the target virtual machine to stop working, download the service configuration information of the virtual acceleration component corresponding to the virtual machine, and store the service configuration information. After completing the downloading, the target virtual machine may resume working.

In a process of implementing the present disclosure, the inventor finds that the prior art has at least the following problem:

Based on the foregoing processing manner, when the service configuration information is being downloaded, if a service packet to be processed by the target virtual machine is received, the service packet cannot be processed because the target virtual machine is currently in an idle state. Consequently, a service processing failure is caused.

SUMMARY

To resolve a problem of a service processing failure in a related technology, embodiments of the present disclosure provide a virtual machine live migration method, apparatus, and system. The technical solutions are as follows:

According to a first aspect, a virtual machine live migration method is provided. The method includes: in a process of live migration of a target virtual machine, obtaining pre-recorded storage location information corresponding to target service configuration information, where the target service configuration information is used by a target virtual acceleration component corresponding to the target virtual machine to perform service processing; reading the target service configuration information in a storage location corresponding to the storage location information; and sending the target service configuration information to a destination server, so that the destination server stores the target service configuration information.

In the solution in this embodiment of the present disclosure, when quantities of virtual machines installed on various network-side servers are uneven, a virtual machine (namely, the target virtual machine) on a server (namely, a source server) including more virtual machines is migrated to a server (namely, the destination server) including fewer virtual machines. Specifically, a skilled person may trigger, by performing an operation, the source server to receive a start instruction of performing the live migration on the target virtual machine, and then the source server may start the process of the live migration of the target virtual machine. In the process of the live migration of the target virtual machine, that is, after receiving the start instruction of performing the live migration on the target virtual machine, the source server may further migrate the target service configuration information in the target virtual acceleration component corresponding to the target virtual machine. Specifically, the source server may prestore storage location information of service configuration information that is used by various virtual acceleration components to perform service processing. Each piece of service configuration information may be stored in a corresponding virtual acceleration component. When receiving the start instruction of performing the live migration on the target virtual machine, the source server may select the storage location information of the target service configuration information from the storage location information of the service configuration information that is used by the various virtual acceleration components to perform service processing. After obtaining the storage location information of the target service configuration information, the source server may determine the storage location corresponding to the storage location information, and then the source server may read the target service configuration information stored in the storage location. After reading the target service configuration information, the source server may send the read target service configuration information to the destination server. Correspondingly, the destination server may receive the target service configuration information sent by the source server, and then store the received target service configuration information. In this way, after the live migration ends, the target virtual machine on the destination server can work normally without stopping working to download the target service configuration information. Therefore, a service processing failure can be avoided.

In one embodiment, before the obtaining pre-recorded storage location information corresponding to target service configuration information, the method further includes: when the target service configuration information is configured for the target virtual acceleration component, determining storage location information that is used to store the target service configuration information and that is in the target virtual acceleration component; and recording the storage location information.

In the solution in this embodiment of the present disclosure, in a working process of the target virtual machine, the corresponding target service configuration information may be configured for the target virtual acceleration component corresponding to the target virtual machine. Specifically, when the corresponding target service configuration information needs to be configured for the target virtual acceleration component, the source server may determine, from storage location information corresponding to the target virtual acceleration component, storage location information corresponding to a storage location that is used to store the target service configuration information, and then store the service configuration in the determined storage location. After determining the storage location information, the source server may further record the storage location information, to subsequently read the corresponding target service configuration information based on the storage location information.

In one embodiment, the storage location information includes a component identifier of the target virtual acceleration component and an offset address that is relative to a start address of a target storage area of the target virtual acceleration component; and the reading the target service configuration information in a storage location corresponding to the storage location information includes: determining, based on a prestored correspondence between a component identifier of a virtual acceleration component and a start address of a storage area, the start address of the target storage area corresponding to the component identifier of the target virtual acceleration component; determining, based on the start address of the target storage area and the offset address, the storage location corresponding to the storage location information; and reading the target service configuration information in the storage location.

In the solution in this embodiment of the present disclosure, a driver of an acceleration component may be pre-installed on the source server, and the acceleration component may prestore the correspondence between a component identifier of a virtual acceleration component and a start address of a storage area. In this case, after obtaining the storage location information, the source server may access the acceleration component by using the pre-installed driver of the acceleration component, and then determine, based on the correspondence that is between a component identifier of a virtual acceleration component and a start address of a storage area and that is prestored in the acceleration component, the start address of the target storage area corresponding to the component identifier included in the storage location information. After determining the start address of the target storage area, the source server may add the start address to the offset address included in the storage location information, to obtain the storage location corresponding to the storage location information, and then read the target service configuration information in the storage location.

In one embodiment, the sending the target service configuration information to a destination server, so that the destination server stores the target service configuration information includes: sending the target service configuration information and the storage location information to the destination server, so that the destination server stores the target service configuration information in a storage location corresponding to the storage location information in the destination server.

In the solution in this embodiment of the present disclosure, after reading virtual machine memory data of the target virtual machine and the target service configuration information, the source server may simultaneously send the virtual machine memory data and the target service configuration information to the destination server. Correspondingly, the destination server may simultaneously receive the virtual machine memory data and the target service configuration information that are sent by the source server, and separately store the virtual machine memory data and the target service configuration information.

In one embodiment, the reading the target service configuration information in a storage location corresponding to the storage location information includes: when virtual machine memory data of the target virtual machine is being read, reading the target service configuration information in the storage location corresponding to the storage location information; and the sending the target service configuration information to a destination server, so that the destination server stores the target service configuration information includes: when the virtual machine memory data is being sent to the destination server, sending the target service configuration information to the destination server, so that the destination server stores the target service configuration information.

According to a second aspect, a virtual machine live migration method is provided. The method includes: receiving, in a process of live migration of a target virtual machine, target service configuration information sent by a source server, where the target service configuration information is used by a target virtual acceleration component corresponding to the target virtual machine to perform service processing; and storing the target service configuration information.

In the solution in this embodiment of the present disclosure, in the process of the live migration of the target virtual machine, after the source server sends the target service configuration information to the destination server, the destination server may receive the target service configuration information sent by the source server, and then store the received target service configuration information.

In one embodiment, the receiving, in a process of live migration of a target virtual machine, target service configuration information sent by a source server includes: in the process of the live migration of the target virtual machine, receiving the target service configuration information and storage location information that are sent by the source server, where the storage location information is location information corresponding to a storage location of the target service configuration information; and the storing the target service configuration information includes: storing the target service configuration information in a storage location corresponding to the storage location information in a destination server.

In the solution in this embodiment of the present disclosure, if the source server further sends the storage location information to the destination server, the destination server may receive the storage location information sent by the source server, so that when storing the target service configuration information, the destination server can store the target service configuration information in the storage location corresponding to the storage location information in the destination server.

According to a third aspect, a virtual machine live migration apparatus is provided. The apparatus includes at least one module, and the at least one module is configured to implement the virtual machine live migration method provided in the first aspect.

According to a fourth aspect, a virtual machine live migration apparatus is provided. The apparatus includes at least one module, and the at least one module is configured to implement the virtual machine live migration method provided in the second aspect.

According to a fifth aspect, a source server is provided. The source server includes a processor and a memory, the processor is configured to execute an instruction stored in the memory, and the processor executes the instruction to implement the virtual machine live migration method provided in the first aspect.

According to a sixth aspect, a destination server is provided. The destination server includes at least one module, and the at least one module is configured to implement the virtual machine live migration method provided in the second aspect.

According to a seventh aspect, a virtual machine live migration system is provided. The system includes a source server and a destination server, where the source server is configured to: in a process of live migration of a target virtual machine, obtain pre-recorded storage location information corresponding to target service configuration information, where the target service configuration information is used by a target virtual acceleration component corresponding to the target virtual machine to perform service processing; read the target service configuration information in a storage location corresponding to the storage location information; and send the target service configuration information to the destination server; and the destination server is configured to: in the process of the live migration of the target virtual machine, receive the target service configuration information sent by the source server; and store the target service configuration information.

According to an eighth aspect, a computer readable storage medium including an instruction is provided. When the computer readable storage medium runs on a source server, the source server is enabled to perform the method in the first aspect.

According to a ninth aspect, a computer program product including an instruction is provided. When the computer program product runs on a source server, the source server is enabled to perform the method in the first aspect.

According to a tenth aspect, a computer readable storage medium including an instruction is provided. When the computer readable storage medium runs on a destination server, the destination server is enabled to perform the method in the second aspect.

According to an eleventh aspect, a computer program product including an instruction is provided. When the computer program product runs on a destination server, the destination server is enabled to perform the method in the second aspect.

The technical solutions provided in the embodiments of the present disclosure bring the following beneficial effects:

In the embodiments of the present disclosure, in the process of the live migration of the target virtual machine, the source server may obtain the locally stored target service configuration information of the target virtual acceleration component corresponding to the target virtual machine, and send the target service configuration information to the destination server, so that the destination server stores the target service configuration information. In the process of the live migration of the target virtual machine, the target virtual machine on the source server is still in a working state. In this way, because the target service configuration information is migrated to the destination server in the process of the live migration of the target virtual machine, after the live migration ends, the target virtual machine on the destination server can work normally without stopping working to download the target service configuration information. Therefore, a service processing failure can be avoided.

DESCRIPTION OF EMBODIMENTS

Figure 1:
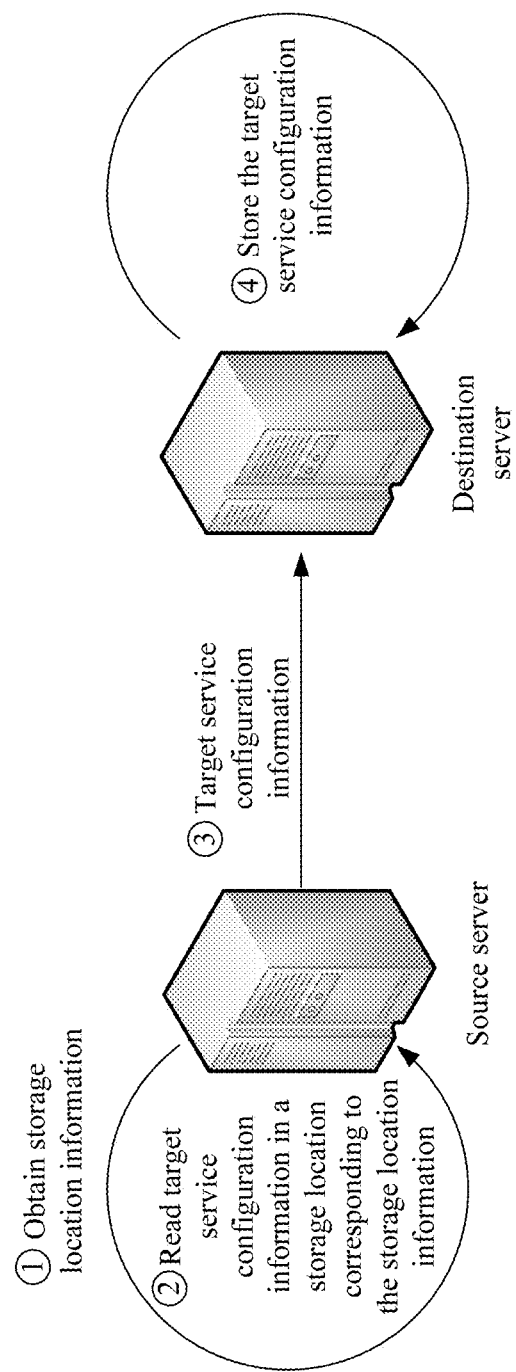
FIG. 1 is a schematic architectural diagram of a system according to an embodiment of the present disclosure.

Embodiments of the present disclosure provide a virtual machine live migration method, and the method may be implemented by both a source server and a destination server. The source server may be a server on which a target virtual machine needs to be emigrated, namely, a server with a virtual machine live migration function and a migration function of target service configuration information, and the destination server may be a server on which a target virtual machine needs to be immigrated. To avoid a service processing failure caused by live migration of a target virtual machine, in a process of the live migration of the target virtual machine, the source server may further migrate target service configuration information in a target virtual acceleration component corresponding to the target virtual machine to the destination server. Specifically, the source server may prestore storage location information of service configuration information that is used by various virtual acceleration components to perform service processing. Each piece of service configuration information may be stored in a corresponding virtual acceleration component. When receiving a start instruction of performing the live migration on the target virtual machine, the source server may select storage location information of the target service configuration information from the storage location information of the service configuration information that is used by the various virtual acceleration components to perform service processing. After obtaining the storage location information of the target service configuration information, the source server may determine a storage location corresponding to the storage location information, then read the target service configuration information in the storage location corresponding to the storage location information, and send the target service configuration information to the destination server. After receiving the target service configuration information, the destination server may store the target service configuration information, so that the target virtual machine can execute a corresponding function based on the target service configuration information. A schematic architectural diagram of a system is shown in FIG. 1.

Figure 2A:
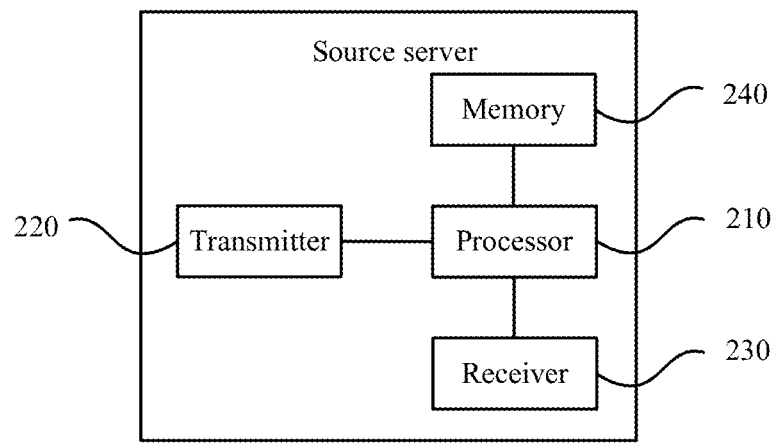
FIG. 2(a) is a schematic structural diagram of a source server according to an embodiment of the present disclosure.

A source server may include a processor 210, a transmitter 220, and a receiver 230. The receiver 230 and the transmitter 220 may be separately connected to the processor 210, as shown in FIG. 2(a). The receiver 230 may be configured to receive a message or data. The transmitter 220 and the receiver 230 may be network interface cards. The transmitter 220 may be configured to send a message or data, that is, send target service configuration information and virtual machine memory data of a target virtual machine. The source server may further include an acceleration component (which may be referred to as an accelerator). When the acceleration component is a network acceleration component, the acceleration component may be a network interface card. The processor 210 may be a control center of the source server, and connects all parts of the entire source server by using various interfaces and lines, such as the receiver 230 and the transmitter 220. In the present disclosure, the processor 210 may be a CPU (Central Processing Unit), and may be configured to read related processing of the target service configuration information. In one embodiment, the processor 210 may include one or more processing units. The processor 210 may integrate an application processor and a modem processor. The application processor mainly processes an operating system, and the modem processor mainly processes radio communication. The processor 210 may be alternatively a digital signal processor, an application-specific integrated circuit, a field programmable gate array, another programmable logic device, or the like. The source server may further include a memory 240. The memory 240 may be configured to store a software program and a module, and the processor 210 performs various function applications and data processing of the source server by reading software code and the module stored in the memory.

Figure 2B:
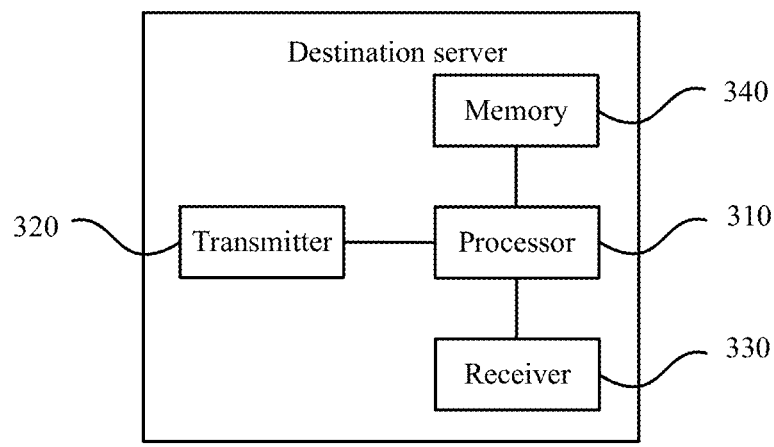
FIG. 2(b) is a schematic structural diagram of a destination server according to an embodiment of the present disclosure.

A destination server may include a processor 310, a transmitter 320, and a receiver 330. The receiver 330 and the transmitter 320 may be separately connected to the processor 310, as shown in FIG. 2(b). The receiver 330 may be configured to receive a message or data. The transmitter 320 and the receiver 330 may be network interface cards. The receiver 300 may be configured to receive a message or data, that is, receive the target service configuration information and the virtual machine memory data of the target virtual machine. The destination server may further include an acceleration component (which may be referred to as an accelerator). When the acceleration component is a network acceleration component, the acceleration component may be a network interface card. The processor 310 may be a control center of the destination server, and connects all parts of the entire destination server by using various interfaces and lines, such as the receiver 330 and the transmitter 320. In the present disclosure, the processor 310 may be a CPU (Central Processing Unit). In one embodiment, the processor 310 may include one or more processing units. The processor 310 may integrate an application processor and a modem processor. The application processor mainly processes an operating system, and the modem processor mainly processes radio communication. The processor 310 may be alternatively a digital signal processor, an application-specific integrated circuit, a field programmable gate array, another programmable logic device, or the like. The destination server may further include a memory 340. The memory 340 may be configured to store a software program and a module, and the processor 310 performs various function applications and data processing of the destination server by reading software code and the module stored in the memory.

Figure 3:
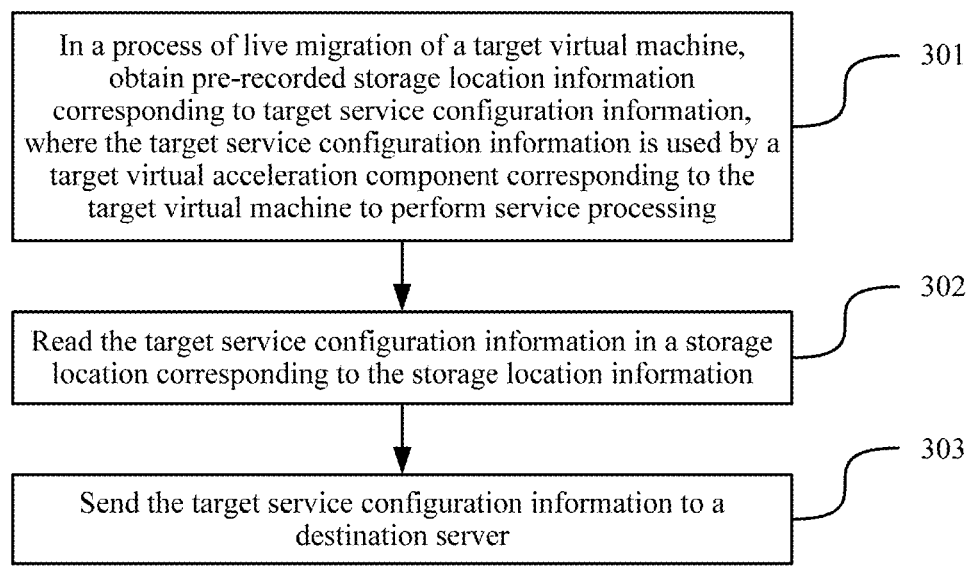
FIG. 3 is a flowchart of a virtual machine live migration method according to an embodiment of the present disclosure.

With reference to a specific implementation, the following describes in detail a processing procedure shown in FIG. 3. Content may be as follows:

Operation 301: In a process of live migration of a target virtual machine, obtain pre-recorded storage location information corresponding to target service configuration information, where the target service configuration information is used by a target virtual acceleration component corresponding to the target virtual machine to perform service processing.

The target virtual acceleration component may be a virtual acceleration component corresponding to the target virtual machine. The virtual acceleration component may be a component that is used to accelerate execution of a corresponding function, and may be referred to as a virtual function, a logical acceleration component, or a virtual accelerator. For example, the virtual acceleration component may be a network acceleration component or a computing acceleration component. The storage location information may be storage location information that is used to store the target service configuration information and that is in the target virtual acceleration component.

In implementation, when quantities of virtual machines installed on various network-side servers are uneven, a virtual machine (namely, the target virtual machine) on a server (namely, a source server) including more virtual machines is migrated to a server (namely, a destination server) including fewer virtual machines. Specifically, a skilled person may trigger, by performing an operation, the source server to receive a start instruction of performing the live migration on the target virtual machine, and then the source server may start the process of the live migration of the target virtual machine. In the process of the live migration of the target virtual machine, that is, after receiving the start instruction of performing the live migration on the target virtual machine, the source server may further migrate the target service configuration information in the target virtual acceleration component corresponding to the target virtual machine. Specifically, the source server may prestore storage location information of service configuration information that is used by various virtual acceleration components to perform service processing. Each piece of service configuration information may be stored in a corresponding virtual acceleration component. When receiving the start instruction of performing the live migration on the target virtual machine, the source server may select the storage location information of the target service configuration information from the storage location information of the service configuration information that is used by the various virtual acceleration components to perform service processing.

In one embodiment, the storage location information corresponding to the target service configuration information may be recorded when the target service configuration information is configured for the target virtual acceleration component. Correspondingly, a processing process may be as follows: When the target service configuration information is configured for the target virtual acceleration component, the storage location information that is used to store the target service configuration information and that is in the target virtual acceleration component is determined; and the storage location information is recorded.

In implementation, in a working process of the target virtual machine, the corresponding target service configuration information may be configured for the target virtual acceleration component corresponding to the target virtual machine. Specifically, when the corresponding target service configuration information needs to be configured for the target virtual acceleration component, the source server may determine, from storage location information corresponding to the target virtual acceleration component, storage location information corresponding to a storage location that is used to store the target service configuration information, and then store the service configuration in the determined storage location. After determining the storage location information, the source server may further record the storage location information, to subsequently read the corresponding target service configuration information based on the storage location information.

For example, if the target virtual acceleration component is a virtual network acceleration component, and the target service configuration information is a route forwarding table, a process of obtaining each piece of route forwarding information in the route forwarding table may be as follows: When the target virtual acceleration component receives a service packet, the target virtual acceleration component may determine a next hop node of the service packet based on the prestored route forwarding table, and then the target virtual acceleration component may forward the service packet to the next hop node. If route forwarding information corresponding to the service packet is not stored in the prestored route forwarding table, the target virtual acceleration component may send the service packet to the target virtual machine, so that the target virtual machine extracts packet information (for example, a source address and a destination address) carried in the service packet. After the source address and the destination address are extracted, the route forwarding information of the service packet is generated, and storage location information corresponding to a storage location that is used to store the route forwarding information and that is in the target virtual component is determined. Further, the storage location information may be recorded, and the route forwarding information is stored in the storage location corresponding to the storage location information.

In one embodiment, the storage location information may include a component identifier of the target virtual acceleration component and an offset address that is relative to a start address of a target storage area of the target virtual acceleration component.

Operation 302: Read the target service configuration information in the storage location corresponding to the storage location information.

In implementation, after obtaining the storage location information of the target service configuration information in the target virtual acceleration component, the source server may determine the storage location corresponding to the storage location information, and then the source server may read the target service configuration information stored in the storage location. The source server may read, through DMA (Direct Memory Access), the target service configuration information in the storage location corresponding to the storage location information.

In one embodiment, if the storage location information includes the component identifier and the offset address, a processing procedure of operation 302 may be as follows: The start address of the target storage area corresponding to the component identifier of the target virtual acceleration component is determined based on a prestored correspondence between a component identifier of a virtual acceleration component and a start address of a storage area; the storage location corresponding to the storage location information is determined based on the start address of the target storage area and the offset address; and the target service configuration information in the storage location is read.

In implementation, a driver of an acceleration component may be pre-installed on the source server, and the acceleration component may prestore the correspondence between a component identifier of a virtual acceleration component and a start address of a storage area. In this case, after obtaining the storage location information, the source server may access the acceleration component by using the pre-installed driver of the acceleration component, and then determine, based on the correspondence that is between a component identifier of a virtual acceleration component and a start address of a storage area and that is prestored in the acceleration component, the start address of the target storage area corresponding to the component identifier included in the storage location information. After determining the start address of the target storage area, the source server may add the start address to the offset address included in the storage location information, to obtain the storage location corresponding to the storage location information, and then read the target service configuration information in the storage location.

In one embodiment, the source server may simultaneously read the target service configuration information and virtual machine memory data. Correspondingly, a processing process of operation 302 may be as follows: When virtual machine memory data of the target virtual machine is being read, the target service configuration information in the storage location corresponding to the storage location information is read.

The virtual machine memory data may be current running data of the target virtual machine.

In implementation, in the process of the live migration of the target virtual machine, before sending the virtual machine memory data to the destination server, the source server may usually read the virtual machine memory data of the target virtual machine stored in the source server. In this case, the source server may first read the virtual machine memory data of the target virtual machine and then read the target service configuration information in the storage location corresponding to the storage location information; or the source server may first read the target service configuration information, and then read the virtual machine memory data of the target virtual machine in the storage location corresponding to the storage location information. In other words, the source server may read the virtual machine memory data of the target virtual machine and the target service configuration information in a serial manner. Alternatively, the source server may read the virtual machine memory data of the target virtual machine and the target service configuration information in parallel. In other words, when reading the virtual machine memory data of the target virtual machine, the source server may read the target service configuration information in the storage location corresponding to the storage location information.

Operation 303: Send the target service configuration information to the destination server, so that the destination server stores the target service configuration information.

In implementation, after reading the target service configuration information, the source server may send the read target service configuration information to the destination server. Correspondingly, the destination server may receive the target service configuration information sent by the source server, and then store the received target service configuration information.

In one embodiment, when sending the virtual machine memory data to the destination server, the source server may send the target service configuration information to the destination server. Correspondingly, a processing process of operation 303 may be as follows: When the virtual machine memory data is being sent to the destination server, the target service configuration information is sent to the destination server, so that the destination server stores the target service configuration information.

In implementation, after reading the virtual machine memory data of the target virtual machine and the target service configuration information, the source server may first send the virtual machine memory data to the destination server and then send the target service configuration information to the destination server. In other words, the source server may send the target service configuration information and the virtual machine memory data to the destination server in a serial manner. Alternatively, the source server may establish two connections with the destination server, and send the virtual machine memory data and the target service configuration information to the destination server in parallel through the two connections. In other words, the source server may simultaneously send the virtual machine memory data and the target service configuration information to the destination server. Correspondingly, the destination server may simultaneously (in parallel) receive the virtual machine memory data and the target service configuration information that are sent by the source server, and separately store the virtual machine memory data and the target service configuration information.

In one embodiment, in addition to sending the target service configuration information to the destination server, the source server may send the storage location information. Correspondingly, a processing process of operation 303 may be as follows: The target service configuration information and the storage location information are sent to the destination server, so that the destination server stores the target service configuration information in a storage location corresponding to the storage location information in the destination server.

In implementation, after obtaining the target service configuration information, the source server may send the target service configuration information and the storage location information to the destination server. Correspondingly, the destination server may receive the target service configuration information and the storage location information that are sent by the source server. After receiving the target service configuration information and the storage location information, the destination server may locally determine the storage location corresponding to the storage location information, and then store the target service configuration information in the storage location.

In addition, a virtual machine monitor may be installed on the source server. In this case, the source server may perform processing in operation 301 to 303 by using the virtual machine monitor.

Figure 4:
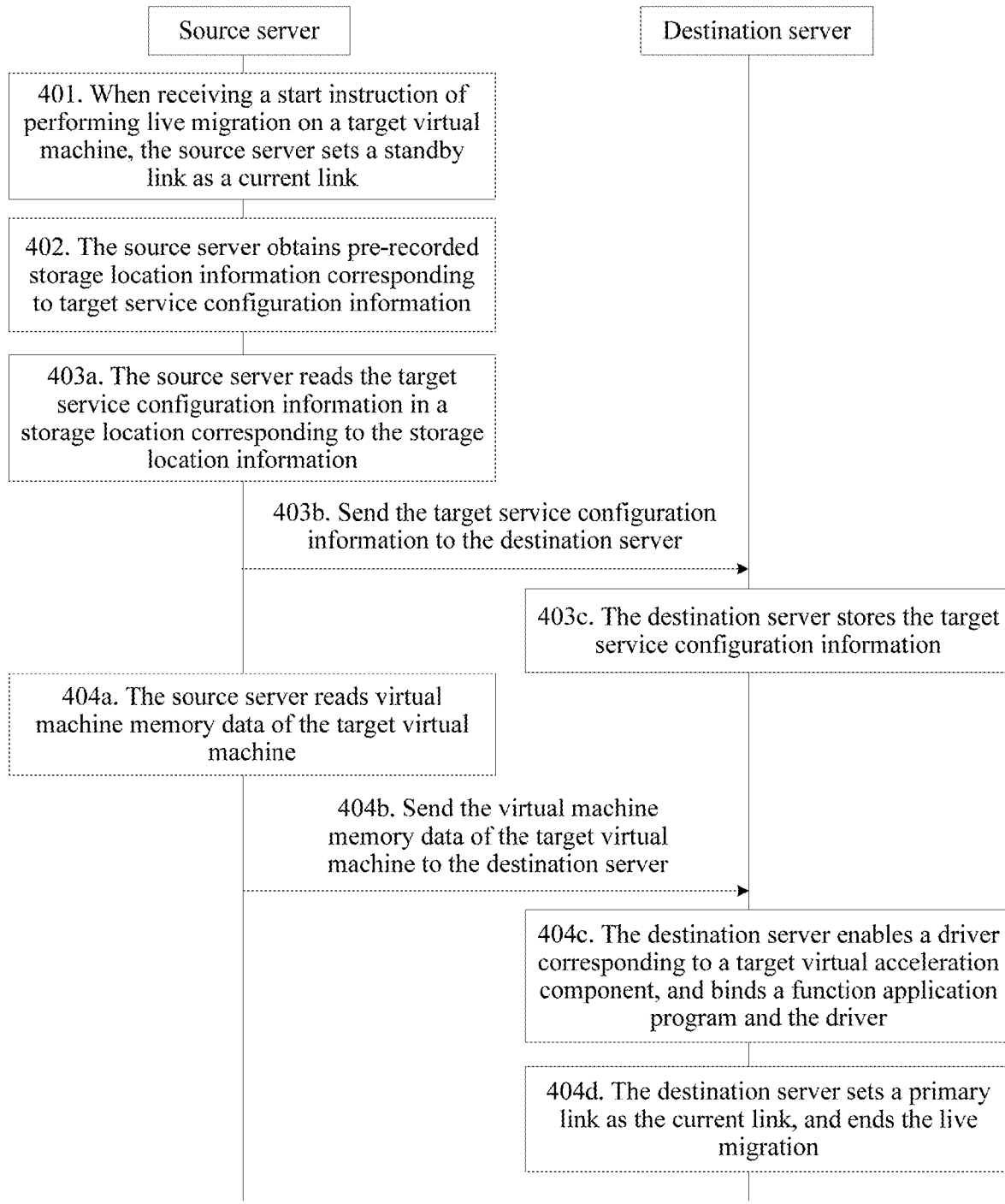
FIG. 4 is a flowchart of a virtual machine live migration method according to an embodiment of the present disclosure.

As shown in FIG. 4, the following describes this solution in detail with reference to a processing operation of live migration of a target virtual machine and a processing operation of target service configuration information.

Operation 401: When receiving a start instruction of performing live migration on a target virtual machine, a source server sets a standby link as a current link.

In implementation, if an application program (which may be referred to as a function application program) capable of implementing a corresponding function is installed in the target virtual machine, and a corresponding target virtual acceleration component is also deployed in the target virtual machine, the target virtual machine may implement the function in two manners. The function may be implemented by using the function application program (a link for implementing the function in this manner may be referred to as a standby link), or the function may be implemented by using the corresponding target virtual acceleration component (a link for implementing the function in this manner may be referred to as a primary link). In a working process of the target virtual machine, the primary link may be set as the current link, in other words, after a service packet is received, the service packet is processed in the second manner. For example, the acceleration component is a network acceleration component, the primary link may be a communication link that is used by the target virtual machine to communicate with the target virtual acceleration component by using a driver of the target virtual acceleration component, and the standby link may be a communication link that is used by the target virtual machine to communicate with the acceleration component by using a virtual machine monitor (VMM). In addition, in the working process of the target virtual machine, the source server may further bind the function application program and the driver of the target virtual acceleration component, in other words, establish a correspondence between the function application program and the driver of the target virtual acceleration component.

When the start instruction of performing the live migration on the target virtual machine is received, the standby link may be set as the current link (the source server may set the standby link as the current link though hot pulling on the driver of the virtual acceleration component). In other words, when a service packet is subsequently received in a live migration process, the service packet may be processed in the first manner.

Operation 402: The source server obtains pre-recorded storage location information corresponding to target service configuration information.

In implementation, the source server may prestore storage location information of service configuration information that is used by various virtual acceleration components to perform service processing. Each piece of service configuration information may be stored in a corresponding virtual acceleration component. When receiving the start instruction of performing the live migration on the target virtual machine, the source server may select the storage location information of the target service configuration information from the storage location information of the service configuration information that is used by the various virtual acceleration components to perform service processing.

When receiving the start instruction of performing the live migration on the target virtual machine, the source server may further establish a connection with a destination server, to subsequently transmit corresponding data to the destination server.

In one embodiment, the storage location information of the target service configuration information may be recorded when the target virtual machine configures the target service configuration information for the target virtual acceleration component. Correspondingly, a processing process may be as follows: When the target service configuration information is configured for the target virtual acceleration component by using the target virtual machine, storage location information that is used to store the target service configuration information and that is in the target virtual acceleration component is determined; and the storage location information is recorded.

In implementation, in the working process of the target virtual machine, the corresponding target service configuration information may be configured for the target virtual acceleration component corresponding to the target virtual machine. Specifically, when the corresponding target service configuration information needs to be configured for the target virtual acceleration component, the source server may determine, from storage location information corresponding to the target virtual acceleration component, storage location information corresponding to a storage location that is used to store the target service configuration information, and then store the target service configuration information in the determined storage location. After the storage location information that is used to store the target service configuration information and that is in the target virtual acceleration component is determined, the source server may further record the storage location information, to subsequently read the corresponding target service configuration information based on the storage location information.

Operation 403a: The source server reads the target service configuration information in a storage location corresponding to the storage location information.

In implementation, after obtaining the storage location information of the target service configuration information in the target virtual acceleration component, the source server may determine the storage location corresponding to the storage location information, and then the source server may read the target service configuration information stored in the storage location.

In one embodiment, if the storage location information includes a component identifier and an offset address, a processing process of operation 403a may be as follows: A start address of a target storage area corresponding to a component identifier of the target virtual acceleration component is determined based on a prestored correspondence between a component identifier of a virtual acceleration component and a start address of a storage area; the storage location corresponding to the storage location information is determined based on the start address of the target storage area and the offset address; and the target service configuration information in the storage location is read.

In implementation, a driver of an acceleration component may be pre-installed on the source server, and the acceleration component may prestore the correspondence between a component identifier of a virtual acceleration component and a start address of a storage area. In this case, after obtaining the storage location information, the source server may access the acceleration component by using the pre-installed driver of the acceleration component, and then determine, based on the correspondence that is between a component identifier of a virtual acceleration component and a start address of a storage area and that is prestored in the acceleration component, the start address of the target storage area corresponding to the component identifier included in the storage location information. After determining the start address of the target storage area, the source server may add the start address to the offset address included in the storage location information, to obtain the storage location corresponding to the storage location information, and then read the target service configuration information in the storage location.

Operation 403b: The source server sends the target service configuration information to the destination server.

In implementation, after reading the target service configuration information, the source server may send the read target service configuration information to the destination server.

In one embodiment, in addition to sending the target service configuration information to the destination server, the source server may send the storage location information. Correspondingly, a processing process of operation 403b may be as follows: The target service configuration information and the storage location information are sent to the destination server, so that the destination server stores the target service configuration information in a storage location corresponding to the storage location information in the destination server.

In implementation, after obtaining the target service configuration information, the source server may send the target service configuration information and the storage location information to the destination server.

Correspondingly, the destination server receives the target service configuration information sent by the source server.

Operation 403c: The destination server stores the target service configuration information.

In implementation, after the source server sends the target service configuration information in the target virtual acceleration component to the destination server, the destination server may receive the target service configuration information sent by the source server, and then store the received target service configuration information.

In one embodiment, if the source server sends the target service configuration information and the storage location information to the destination server, correspondingly, the destination server may receive the target service configuration information and the storage location information sent by the source server. After receiving the target service configuration information and the storage location information, the destination server may locally determine the storage location corresponding to the storage location information, and then store the target service configuration information in the storage location.

Operation 404a: The source server reads virtual machine memory data of the target virtual machine.

The virtual machine memory data may be current running data of the target virtual machine.

It should be noted that, operation 403*a* and operation 404*a* are not performed in a fixed order. The source server may simultaneously perform operation 403*a* and operation 404*a*, or may perform operation 403*a* before operation 404*a*, or may perform operation 404*a* before operation 403*a*.

Operation 404*b*: The source server sends the virtual machine memory data of the target virtual machine to the destination server.

In implementation, after the source server sends the virtual machine memory data to the destination server, correspondingly, the destination server may receive the virtual machine memory data sent by the source server, monitor a migration status in real time, and wait for completion of the migration. During the virtual machine live migration, the virtual machine memory data of the target virtual machine may be migrated to the destination server though iterative memory copy.

It should be noted that, if the source server simultaneously reads the virtual machine memory data and the target service configuration information, the source server may simultaneously send the virtual machine memory data and the target service configuration information to the destination server.

Operation 404*c*: The destination server enables the driver corresponding to the target virtual acceleration component, and binds the function application program and the driver.

Operation 404*d*: The destination server sets the primary link as the current link, and ends the live migration.

In addition, before the live migration is performed on the target virtual machine, the destination server may further load a virtual machine mirror and prepare resources required for the to-be-migrated target virtual machine. The required resources include a computing resource, a storage resource, a network resource, and the like.

In this embodiment of the present disclosure, in the process of the live migration of the target virtual machine, the source server may obtain the locally stored target service configuration information of the target virtual acceleration component corresponding to the target virtual machine, and send the target service configuration information to the destination server, so that the destination server stores the target service configuration information. In the process of the live migration of the target virtual machine, the target virtual machine on the source server is still in a working state. In this way, because the target service configuration information is migrated to the destination server in the process of the live migration of the target virtual machine, after the live migration ends, the target virtual machine on the destination server can work normally without stopping working to download the target service configuration information. Therefore, a service processing failure can be avoided.

Figure 5:
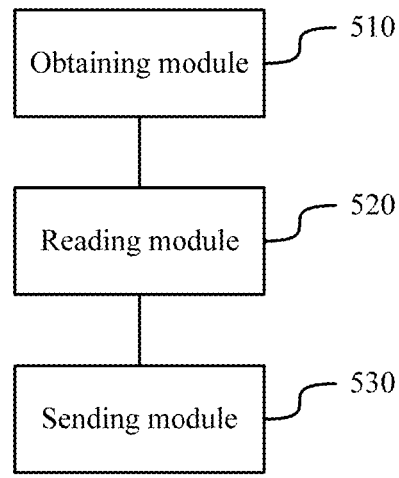
FIG. 5 is a schematic structural diagram of a virtual machine live migration apparatus according to an embodiment of the present disclosure.

Based on a same technical concept, an embodiment of the present disclosure further provides a virtual machine live migration apparatus. As shown in FIG. 5, the apparatus includes an obtaining module 510, a reading module 520, and a sending module 530.

The obtaining module 510 is configured to: in a process of live migration of a target virtual machine, obtain pre-recorded storage location information corresponding to target service configuration information, where the target service configuration information is used by a target virtual acceleration component corresponding to the target virtual machine to perform service processing. Specifically, the obtaining module 510 may implement the obtaining function in operation 301 and another implicit operation.

The reading module 520 is configured to read the target service configuration information in a storage location corresponding to the storage location information. Specifically, the reading module 520 may implement the reading function in operation 302 and another implicit operation.

The sending module 530 is configured to send the target service configuration information to a destination server, so that the destination server stores the target service configuration information. Specifically, the sending module 530 may implement the sending function in operation 303 and another implicit operation.

Figure 6:
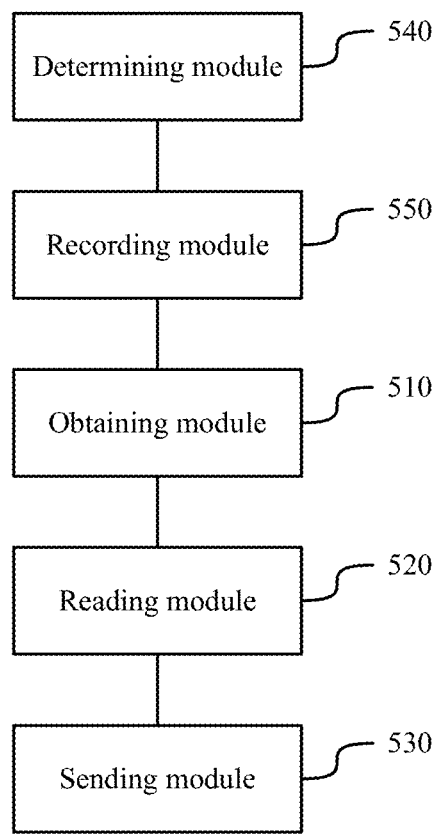
FIG. 6 is a schematic structural diagram of a virtual machine live migration apparatus according to an embodiment of the present disclosure.

In one embodiment, as shown in FIG. 6, the apparatus further includes:

a determining module 540, configured to: when the target service configuration information is configured for the target virtual acceleration component, determine storage location information that is used to store the target service configuration information and that is in the target virtual acceleration component; and a recording module 550, configured to record the storage location information.

In one embodiment, the storage location information includes a component identifier of the target virtual acceleration component and an offset address that is relative to a start address of a target storage area of the target virtual acceleration component.

The reading module 520 is configured to:

determine, based on a prestored correspondence between a component identifier of a virtual acceleration component and a start address of a storage area, the start address of the target storage area corresponding to the component identifier of the target virtual acceleration component;

determine, based on the start address of the target storage area and the offset address, the storage location corresponding to the storage location information; and read the target service configuration information in the storage location.

In one embodiment, the sending module 530 is configured to:

send the target service configuration information and the storage location information to the destination server.

In one embodiment, the reading module 520 is configured to:

when virtual machine memory data of the target virtual machine is being read, read the target service configuration information in the storage location corresponding to the storage location information.

The sending module 530 is configured to:

when the virtual machine memory data is being sent to the destination server, send the target service configuration information to the destination server.

It should be noted that, the obtaining module 510, the reading module 520, the sending module 530, the determining module 540, and the recording module 550 may be implemented by a processor, by a processor and a memory together, or by a processor executing a program instruction in a memory.

Figure 7:
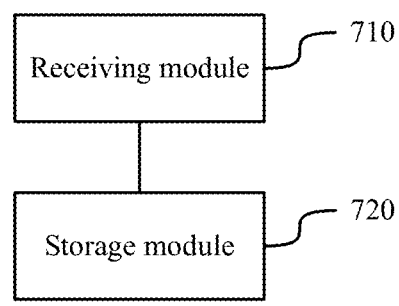
FIG. 7 is a schematic structural diagram of a virtual machine live migration apparatus according to an embodiment of the present disclosure.

Based on a same technical concept, an embodiment of the present disclosure further provides a virtual machine live migration apparatus. As shown in FIG. 7, the apparatus includes a receiving module 710 and a storage module 720.

The receiving module 710 is configured to: in a process of live migration of a target virtual machine, receive target service configuration information sent by a source server, where the target service configuration information is used by a target virtual acceleration component corresponding to the target virtual machine to perform service processing. Specifically, the receiving module 710 may implement the foregoing receiving function and another implicit operation.

The storage module 720 is configured to store the target service configuration information. Specifically, the storage module 720 may implement the foregoing storage function and another implicit operation.

In one embodiment, the receiving module 710 is configured to:

in the process of the live migration of the target virtual machine, receive the target service configuration information and storage location information that are sent by the source server, where the storage location information may be location information corresponding to a storage location of the target service configuration information.

The storage module 720 is configured to:

store the target service configuration information in a storage location corresponding to the storage location information in a destination server.

It should be noted that, the receiving module 710 and the storage module 720 may be implemented by a processor, by a processor and a memory together, or by a processor executing a program instruction in a memory.

In this embodiment of the present disclosure, in the process of the live migration of the target virtual machine, the source server may obtain the locally stored target service configuration information of the target virtual acceleration component corresponding to the target virtual machine, and send the target service configuration information to the destination server, so that the destination server stores the target service configuration information. In the process of the live migration of the target virtual machine, the target virtual machine on the source server is still in a working state. In this way, because the target service configuration information is migrated to the destination server in the process of the live migration of the target virtual machine, after the live migration ends, the target virtual machine on the destination server can work normally without stopping working to download the target service configuration information. Therefore, a service processing failure can be avoided.

It should be noted that, when the virtual machine live migration apparatus provided in the foregoing embodiment performs virtual machine live migration, division of the foregoing function modules is merely used as an example for description. In actual application, the foregoing functions may be allocated to different function modules for implementation as required, in other words, an internal structure of the source server is divided into different function modules to implement all or some of the functions described above. In addition, the virtual machine live migration apparatus provided in the foregoing embodiment pertains to a same concept as the embodiment of the virtual machine live migration method. For a specific implementation process of the virtual machine live migration apparatus, refer to the method embodiment. Details are not described herein again.

Based on a same technical concept, an embodiment of the present disclosure further provides a virtual machine live migration system. The system includes a source server and a destination server. The source server is configured to: in a process of live migration of a target virtual machine, obtain pre-recorded storage location information corresponding to target service configuration information, where the target service configuration information is used by a target virtual acceleration component corresponding to the target virtual machine to perform service processing; read the target service configuration information in a storage location corresponding to the storage location information; and send the target service configuration information to the destination server. The destination server is configured to: in the process of the live migration of the target virtual machine, receive the target service configuration information sent by the source server; and store the target service configuration information.

In this embodiment of the present disclosure, in the process of the live migration of the target virtual machine, the source server may obtain the locally stored target service configuration information of the target virtual acceleration component corresponding to the target virtual machine, and send the target service configuration information to the destination server, so that the destination server stores the target service configuration information. In the process of the live migration of the target virtual machine, the target virtual machine on the source server is still in a working state. In this way, because the target service configuration information is migrated to the destination server in the process of the live migration of the target virtual machine, after the live migration ends, the target virtual machine on the destination server can work normally without stopping working to download the target service configuration information. Therefore, a service processing failure can be avoided.

All or some of the foregoing embodiments may be implemented by using software, hardware, firmware, or any combination thereof. When software is used to implement the embodiments, the embodiments may be implemented all or partially in a form of a computer program product. The computer program product includes one or more computer instructions. When the computer program instructions are loaded and executed on a device, the procedures or functions in the embodiments of the present disclosure are all or partially generated. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, or microwave) manner. The computer readable storage medium may be any usable medium accessible by the device, or a data storage device, such as a server or a data center, integrating one or more usable media. The usable medium may be a magnetic medium (for example, a floppy disk, a hard disk, or a magnetic tape), an optical medium (for example, a digital versatile disk (DVD)), or a semiconductor medium (for example, a solid state disk).

A person of ordinary skill in the art may understand that all or some of the operations of the embodiments may be implemented by hardware or a program instructing related hardware. The program may be stored in a computer readable storage medium. The storage medium may be a read-only memory, a magnetic disk, an optical disc, or the like.

The foregoing descriptions are merely an embodiment of the present disclosure, but are not intended to limit the present disclosure. Any modification, equivalent replacement, or improvement made without departing from the spirit and principle of the present disclosure shall fall within the protection scope of the present disclosure.

What is claimed is:

1. A virtual machine live migration method, comprising:
in a process of live migration of a target virtual machine;
obtaining pre-recorded storage location information corresponding to target service configuration information, wherein the target service configuration information is used by a target virtual acceleration component corresponding to the target virtual machine to perform service processing, wherein the storage location information comprises a component identifier of the target virtual acceleration component and an offset address that is relative to a start address of a target storage area of the target virtual acceleration component;

reading the target service configuration information in a storage location corresponding to the storage location information; and sending the target service configuration information to a destination server, wherein the target virtual acceleration component is configured to implement a function on the target virtual machine as a primary link and the target virtual machine comprises an application program to implement the function on the target virtual machine as a standby link, and wherein the method further comprises, prior to reading the target service configuration information in the storage location corresponding to the storage location information, setting the standby link as a current link of the target virtual machine.

2. The method according to claim 1, wherein before the obtaining the pre-recorded storage location information corresponding to target service configuration information, the method further comprises:

when the target service configuration information is configured for the target virtual acceleration component, determining the storage location information that is used to store the target service configuration information and that is in the target virtual acceleration component; and recording the storage location information.

3. The method according to claim 1, wherein the reading the target service configuration information in the storage location corresponding to the storage location information comprises:

determining, based on a prestored correspondence between a component identifier of a virtual acceleration component and a start address of a storage area, the start address of the target storage area corresponding to the component identifier of the target virtual acceleration component;

determining, based on the start address of the target storage area and the offset address, the storage location corresponding to the storage location information; and reading the target service configuration information in the storage location.

4. The method according to claim 1, wherein the sending the target service configuration information to the destination server comprises:

sending the target service configuration information and the storage location information to the destination server.

5. The method according to claim 1, wherein the reading the target service configuration information in the storage location corresponding to the storage location information comprises:

when virtual machine memory data of the target virtual machine is being read, reading the target service configuration information in the storage location corresponding to the storage location information; and the sending the target service configuration information to a destination server comprises:

when the virtual machine memory data is being sent to the destination server, sending the target service configuration information to the destination server.

6. The method according to claim 1, wherein the target virtual acceleration component comprises a virtual function based on a single-root I/O virtualization (SR-IOV) technology.

7. A virtual machine live migration method, comprising:

receiving, in a process of live migration of a target virtual machine, target service configuration information and storage location information that are sent by a source server, wherein the target service configuration information is used by a target virtual acceleration component corresponding to the target virtual machine to perform service processing, wherein the storage location information comprises a component identifier of the target virtual acceleration component and an offset address that is relative to a start address of a target storage area of the target virtual acceleration component; and storing the target service configuration information, wherein the target virtual acceleration component is configured to implement a function on the target virtual machine as a primary link and the target virtual machine comprises an application program to implement the function on the target virtual machine as a standby link, and wherein the method further comprises, after storing the target service configuration information, setting the primary link as a current link of the target virtual machine.

8. The method according to claim 7, wherein the storing the target service configuration information comprises:

storing the target service configuration information in a storage location corresponding to the storage location information in a destination server.

9. A source server, comprising a processor, memory, and a transmitter, wherein the processor is configured to:

in a process of live migration of a target virtual machine, obtain pre-recorded storage location information corresponding to target service configuration information from the memory, wherein the target service configuration information is used by a target virtual acceleration component corresponding to the target virtual machine to perform service processing, wherein the storage location information comprises a component identifier of the target virtual acceleration component and an offset address that is relative to a start address of a target storage area of the target virtual acceleration component; and read the target service configuration information in a storage location corresponding to the storage location information, and wherein the transmitter is configured to send the target service configuration information to a destination server, wherein the target virtual acceleration component is configured to implement a function on the target virtual machine as a primary link and the target virtual machine comprises an application program to implement the function on the target virtual machine as a standby link, and wherein the processor is further configured to, prior to reading the target service configuration information in the storage location corresponding to the storage location information, set the standby link as a current link of the target virtual machine.

10. The source server according to claim 9, wherein the processor is further configured to:

when the target service configuration information is configured for the target virtual acceleration component, determine the storage location information that is used to store the target service configuration information and that is in the target virtual acceleration component; and
record the storage location information.

11. The source server according to claim 9, wherein the processor is further configured to:
determine, based on a prestored correspondence between a component identifier of a virtual acceleration component and a start address of a storage area, the start address of the target storage area corresponding to the component identifier of the target virtual acceleration component;
determine, based on the start address of the target storage area and the offset address, the storage location corresponding to the storage location information; and
read the target service configuration information in the storage location.

12. The source server according to claim 9, wherein the transmitter is further configured to:
send the target service configuration information and the storage location information to the destination server.

13. The source server according to claim 9, wherein the processor is further configured to:
when virtual machine memory data of the target virtual machine is being read, read the target service configuration information in the storage location corresponding to the storage location information; and
the transmitter is further configured to:
when the virtual machine memory data is being sent to the destination server, send the target service configuration information to the destination server.

14. The source server according to claim 9, wherein the target virtual acceleration component comprises a virtual function based on a single-root I/O virtualization (SR-IOV) technology.

15. A destination server, comprising a processor, memory, and a receiver, wherein
the receiver is configured to: in a process of live migration of a target virtual machine, receive target service configuration information and storage location information that are sent by a source server, wherein the target service configuration information is used by a target virtual acceleration component corresponding to the target virtual machine to perform service processing, wherein the storage location information comprises a component identifier of the target virtual acceleration component and an offset address that is relative to a start address of a target storage area of the target virtual acceleration component; and
the processor is configured to store the target service configuration information in the memory,
wherein the target virtual acceleration component is configured to implement a function on the target virtual machine as a primary link and the target virtual machine comprises an application program to implement the function on the target virtual machine as a standby link, and
wherein the processor is further configured to, after storing the target service configuration information in the memory, set the primary link as a current link of the target virtual machine.

16. The destination server according to claim 15, wherein the processor is further configured to:
store the target service configuration information in a storage location corresponding to the storage location information in the destination server.

\* \* \* \* \*